United States Patent
Kurokawa et al.

(10) Patent No.: US 8,988,668 B2
(45) Date of Patent: Mar. 24, 2015

(54) FILM THICKNESS MEASUREMENT APPARATUS AND FILM THICKNESS MEASUREMENT METHOD

(75) Inventors: Masaaki Kurokawa, Tokyo (JP); Jun Yasui, Tokyo (JP); Keiichi Kenmotsu, Tokyo (JP); Shigetoshi Shiotani, Tokyo (JP)

(73) Assignee: Mitsubishi Hitachi Power Systems, Ltd., Yokohama-Shi (JP)

(*) Notice: Subject to any disclaimer, the term of this patent is extended or adjusted under 35 U.S.C. 154(b) by 0 days.

(21) Appl. No.: 14/239,468

(22) PCT Filed: Aug. 21, 2012

(86) PCT No.: PCT/JP2012/071082
§ 371 (c)(1),
(2), (4) Date: Feb. 18, 2014

(87) PCT Pub. No.: WO2013/031583
PCT Pub. Date: Mar. 7, 2013

(65) Prior Publication Data
US 2014/0192349 A1    Jul. 10, 2014

(30) Foreign Application Priority Data
Aug. 30, 2011    (JP) .................................. 2011-187980

(51) Int. Cl.
*G01N 21/00*    (2006.01)
*G01K 1/14*    (2006.01)
(Continued)

(52) U.S. Cl.
CPC ............... *G01K 1/143* (2013.01); *G01B 11/24* (2013.01); *G01B 5/205* (2013.01); *G01B 7/105* (2013.01); *F01D 21/003* (2013.01); *F01D 5/288* (2013.01)

USPC .......................................................... 356/72

(58) Field of Classification Search
USPC ................................................... 356/72–73
See application file for complete search history.

(56) References Cited

U.S. PATENT DOCUMENTS

| 5,627,771 A | 5/1997 | Makino |
| 2004/0070773 A1* | 4/2004 | Hirose et al. .................. 356/630 |
| 2011/0218741 A1 | 9/2011 | Hirano et al. |

FOREIGN PATENT DOCUMENTS

| JP | 61-114121 A | 5/1986 |
| JP | 61-126409 A | 6/1986 |

(Continued)

OTHER PUBLICATIONS

International Search Report dated Oct. 2, 2012 issued in corresponding application No. PCT/JP2012/071082.

(Continued)

*Primary Examiner* — Abdullahi Nur
(74) *Attorney, Agent, or Firm* — Westerman, Hattori, Daniels & Adrian, LLP (57) ABSTRACT

A film thickness measurement apparatus includes: an ECT sensor for measuring a film thickness of a thermal barrier coating formed on a turbine blade; a storage unit for storing a measurement point on the turbine blade which is a point where the film thickness of the thermal barrier coating is measured; a laser displacement meter for measuring a shape of the turbine blade; a measurement position calculation unit for calculating an actual measurement point suitable for actual film thickness measurement using the ECT sensor, based on the shape of the turbine blade measured by the laser displacement meter and the measurement point on the turbine blade stored in the storage unit; and an arm drive unit for driving the ECT sensor to adjust a measurement position of the ECT sensor based on the actual measurement point calculated by the measurement position calculation unit.

4 Claims, 7 Drawing Sheets

(51) Int. Cl.
*G01B 11/24* (2006.01)
*G01B 5/20* (2006.01)
*G01B 7/06* (2006.01)
*F01D 21/00* (2006.01)
*F01D 5/28* (2006.01)

(56) References Cited

FOREIGN PATENT DOCUMENTS

| JP | 3-110303 U | 11/1991 |
|---|---|---|
| JP | 5-52702 U | 7/1993 |
| JP | 5-322549 A | 12/1993 |
| JP | 7-21238 A | 1/1995 |
| JP | 7-91948 A | 4/1995 |
| JP | 10-175085 A | 6/1998 |
| JP | 3092722 B2 | 9/2000 |
| JP | 2003-240504 A | 8/2003 |
| JP | 2004-156444 A | 6/2004 |
| JP | 2007-292769 A | 11/2007 |
| JP | 2007-298292 A | 11/2007 |
| WO | 2010/044139 A1 | 4/2010 |

OTHER PUBLICATIONS

Written Opinion of the International Searching Authonty dated Oct. 2, 2012 issued in corresponding application No. PCT/JP2012/071082.

* cited by examiner

CONVEX PORTION

FILM THICKNESS MEASUREMENT APPARATUS AND FILM THICKNESS MEASUREMENT METHOD

TECHNICAL FIELD

The present invention relates to a film thickness measurement apparatus and a film thickness measurement method for measuring a film thickness of a thermal barrier coating applied to an object to be measured.

BACKGROUND ART

A thermal barrier coating (TBC) is applied to a gas turbine blade such as a stationary blade or a moving blade used in a gas turbine. To manufacture a gas turbine blade of high quality, a film thickness of the TBC needs to be controlled in a manufacturing process of the gas turbine blade.

PTL 1 discloses a technique relating to a coating thickness measuring gauge that measures a thickness of a non-conductive thin coating placed on a conductive substrate.

CITATION LIST

Patent Literature

{PTL 1}
The Publication of Japanese Patent No. 3092722

SUMMARY OF INVENTION

Technical Problem

A TBC film thickness of a gas turbine blade is manually measured by an examiner using an eddy current type displacement sensor (hereinafter referred to as "ECT sensor"). TBC film thickness measurement is performed, for example, before shipment of a gas turbine blade. For a stationary blade, the measurement is performed at about 32 portions on one blade. A TBC film thickness is, for example, 500 µm, and film thickness accuracy required is, for example, ±20 µm for a flat portion of a product, and for example, ±50 µm for a complex curved portion.

The film thickness measurement using the ECT sensor is performed in such a manner that the ECT sensor is brought into contact with a surface of the TBC, a distance between the ECT sensor and a metal member as a substrate of the TBC is measured, and a measurement result is obtained as a film thickness. Thus, if the measurement is performed with the ECT sensor being tilted with respect to the surface of the TBC, an accurate film thickness cannot be obtained. The film thickness measurement is manually performed, and thus the ECT sensor is easily tilted particularly at a complex-shaped portion, which makes it difficult to perform accurate measurement. Also, measurement in an accurate predetermined position is difficult. Furthermore, for accurate, a large amount of, and quick measurement, an examiner needs to be highly skilled.

Also, the TBC immediately after application is high in temperature, at about 300° C. due to thermal spray of a material. Thus, with the current method manually performed by an examiner, film thickness measurement immediately after application is difficult in terms of safety, and measurement for determining whether reapplication is required or not needs to be performed after the TBC is cooled.

The present invention is achieved in view of such circumstances, and has an object to provide a film thickness measurement apparatus and a film thickness measurement method that can efficiently and accurately measure a film thickness of a thermal barrier coating applied to an object to be measured.

Solution to Problem

A first aspect of the present invention provides a film thickness measurement apparatus including: a film thickness measurement unit that measures a film thickness of a thermal barrier coating formed on an object to be measured; a storage unit that stores a measurement point on the object to be measured which is a point where the film thickness of the thermal barrier coating is measured; a shape measurement unit that measures a shape of the object to be measured; a measurement position calculation unit that calculates an actual measurement point suitable for actual film thickness measurement using the film thickness measurement unit, based on the shape of the object to be measured which is measured by the shape measurement unit and the measurement point on the object to be measured which is stored in the storage unit; and a drive unit that drives the film thickness measurement unit to adjust a measurement position of the film thickness measurement unit based on the actual measurement point calculated by the measurement position calculation unit.

According to this configuration, the measurement point on the object to be measured which is the point where the film thickness of the thermal barrier coating is measured is stored in the storage unit, and the actual measurement point suitable for actual film thickness measurement using the film thickness measurement unit is calculated based on the shape of the object to be measured which is measured by the measurement position calculation unit. Then, the drive unit drives the film thickness measurement unit to move the film thickness measurement unit to an actual measurement position suitable for the film thickness measurement and adjust the measurement position of the film thickness measurement unit, thereby increasing accuracy of the film thickness measurement. The object to be measured is, for example, a gas turbine blade such as a stationary blade or a moving blade.

In the first aspect of the present invention, the shape measurement unit may perform scanning with laser light in a linear direction to calculate the shape of the object to be measured in a two-dimensional plane.

According to this configuration, the shape of the object to be measured including the measurement point is calculated in the two-dimensional plane. Thus, even for an object to be measured having an outer surface with a complex curved shape, a shape of the object to be measured and an actual measurement position suitable for film thickness measurement using the film thickness measurement unit can be easily obtained.

In the first aspect of the present invention, the apparatus may further include a temperature measurement unit that measures a surface temperature of the thermal barrier coating, and the film thickness measurement unit may correct the measured film thickness based on the surface temperature measured by the temperature measurement unit.

According to this configuration, the film thickness measured by the film thickness measurement unit is corrected based on the surface temperature measured by the temperature measurement unit. Thus, even if a measured value changes depending on the temperature due to temperature characteristics of the film thickness measurement unit, a more accurate film thickness of the thermal barrier coating can be obtained.

A second aspect of the present invention provides a film thickness measurement method including the steps of: a film thickness measurement unit measuring a film thickness of a thermal barrier coating formed on an object to be measured; a shape measurement unit measuring a shape of the object to be measured; a measurement position calculation unit calculating an actual measurement point suitable for actual film thickness measurement using the film thickness measurement unit, based on the shape of the object to be measured which is measured by the shape measurement unit and a measurement point on the object to be measured which is stored in a storage unit and is a point where the film thickness of the thermal barrier coating is measured; and a drive unit driving the film thickness measurement unit to adjust a measurement position of the film thickness measurement unit based on the actual measurement point calculated by the measurement position calculation unit.

Advantageous Effects of Invention

According to the present invention, a film thickness of a thermal barrier coating applied to an object to be measured can be efficiently and accurately measured.

DESCRIPTION OF EMBODIMENTS

Now, embodiments of the present invention will be described with reference to the drawings.

First Embodiment

A film thickness measurement apparatus 1 according to a first embodiment of the present invention will be described.

Figure 1:
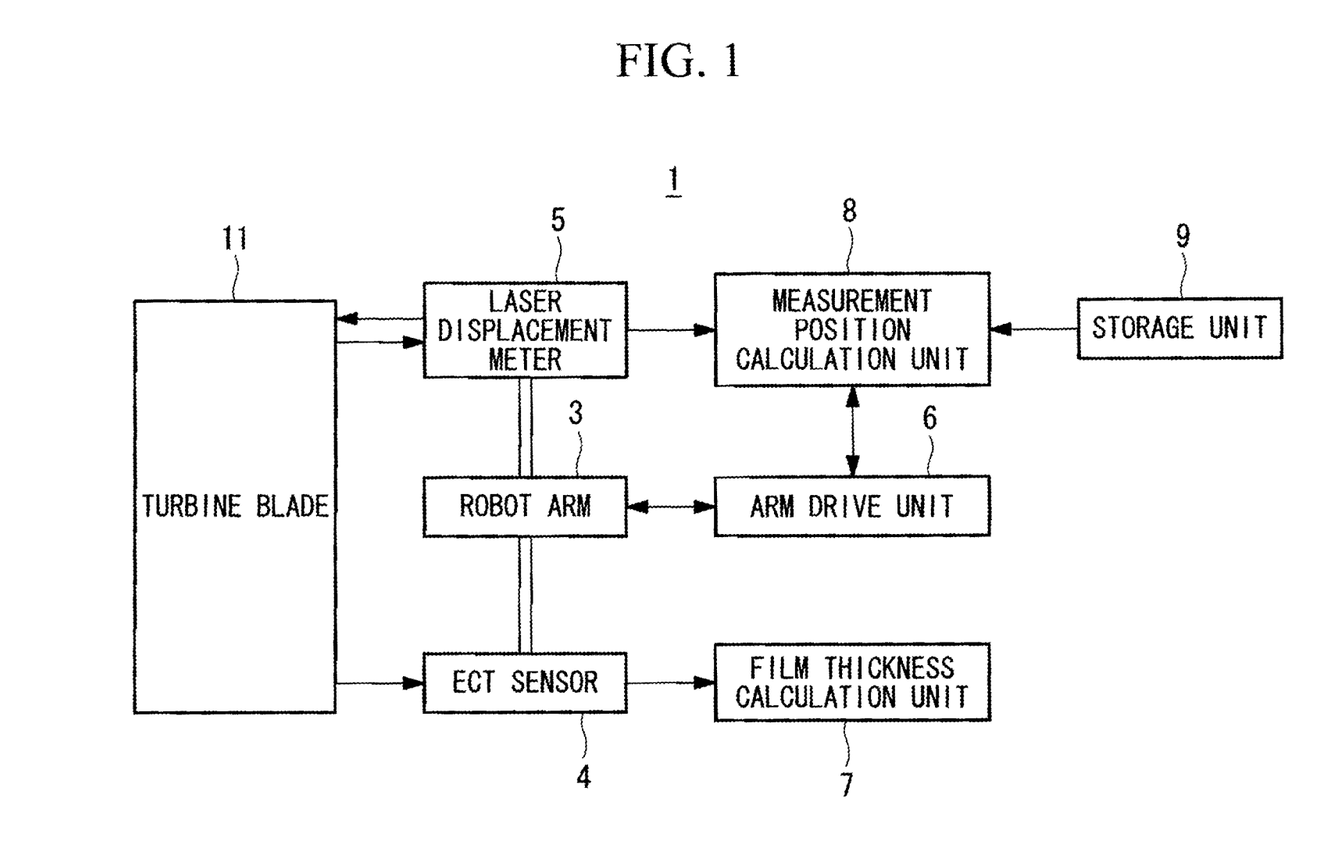
FIG. 1 is a block diagram showing a film thickness measurement apparatus according to a first embodiment of the present invention.

As shown in FIG. 1, the film thickness measurement apparatus 1 includes a robot arm 3, an ECT sensor 4 and a laser displacement meter 5 provided on the robot arm 3, an arm drive unit 6, a film thickness measurement unit 7, a measurement position calculation unit 8, a storage unit 9, or the like.

Figure 2:
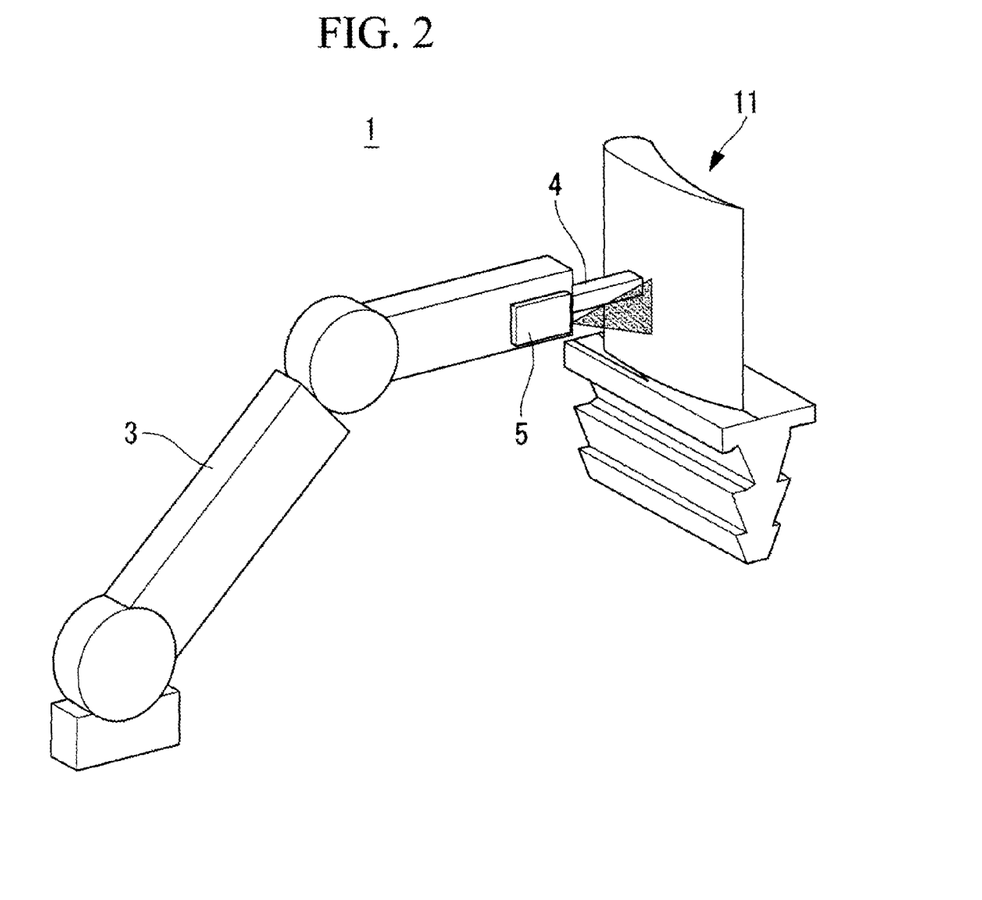
FIG. 2 is a perspective view showing the film thickness measurement apparatus according to the first embodiment.

As shown in FIG. 2, the film thickness measurement apparatus 1 measures a film thickness of a thermal barrier coating (TBC) applied to a surface of a turbine blade 11 (including both a moving blade and a stationary blade of a gas turbine). The TBC includes a metal member as a substrate, on which, for example, MCrAlY (M:Co, Ni, CoNi, or the like) alloy having high oxidation resistance is applied as a bond coating, and $ZrO_2$ ceramics (YSZ: $ZrO_2$ partially stabilized with 8 wt % of $Y_2O_3$: Yttria Partially Stabilized Zirconia) having low thermal conductivity as a top coating.

The ECT sensor 4 and the laser displacement meter 5 are secured to, for example, a front end portion of the robot arm 3, and the robot arm 3 is driven to change positions and directions of the ECT sensor 4 and the laser displacement meter 5.

The ECT sensor 4 is a measurement device using an eddy current, and obtains, as a measurement signal, a distance between the metal member as an object to be measured and the ECT sensor 4. Thus, the ECT sensor 4 is brought into contact with a surface of the TBC to measure the distance between the ECT sensor 4 and the metal member as the substrate of the TBC, and a measurement result is obtained as a film thickness of the TBC.

The laser displacement meter 5 is, for example, a two-dimensional laser displacement meter, performs scanning with laser light in a linear direction, and obtains a shape of the object to be measured in a two-dimensional plane obtained by scanning.

The arm drive unit 6 is a motor or a transmission member that drives the robot arm 3, and changes a position and a direction of the robot arm 3. The arm drive unit 6 can change the position and the direction of the robot arm 3 based on a current position and direction of the robot arm 3 (including current positions and directions of the ECT sensor 4 and the laser displacement meter 5), and an optimum measurement point (actual measurement point) for film thickness measurement using the ECT sensor 4. Thus, the position and the direction of the ECT sensor 4 are adjusted to, for example, a position and a direction suitable for the film thickness measurement using the ECT sensor 4.

The film thickness measurement unit 7 obtains a measurement signal from the ECT sensor 4, and converts the measurement signal to calculate a film thickness of the TBC.

The measurement position calculation unit 8 superimposes and fits a surface shape of the turbine blade 11 as the object to be measured which is measured by the laser displacement meter 5, on data (CAD data) relating to the shape of the turbine blade 11 as the object to be measured which is stored in the storage unit 9. The measurement position calculation unit 8 calculates an optimum measurement point suitable for actual film thickness measurement on the turbine blade 11 based on a film thickness measurement point stored in the storage unit 9.

The storage unit 9 stores data on the shape of the turbine blade 11 as the object to be measured (for example, CAD data), and the film thickness measurement point on the turbine blade 11 associated with the CAD data.

Next, a film thickness measurement method using the film thickness measurement apparatus 1 will be described.

Figure 3:
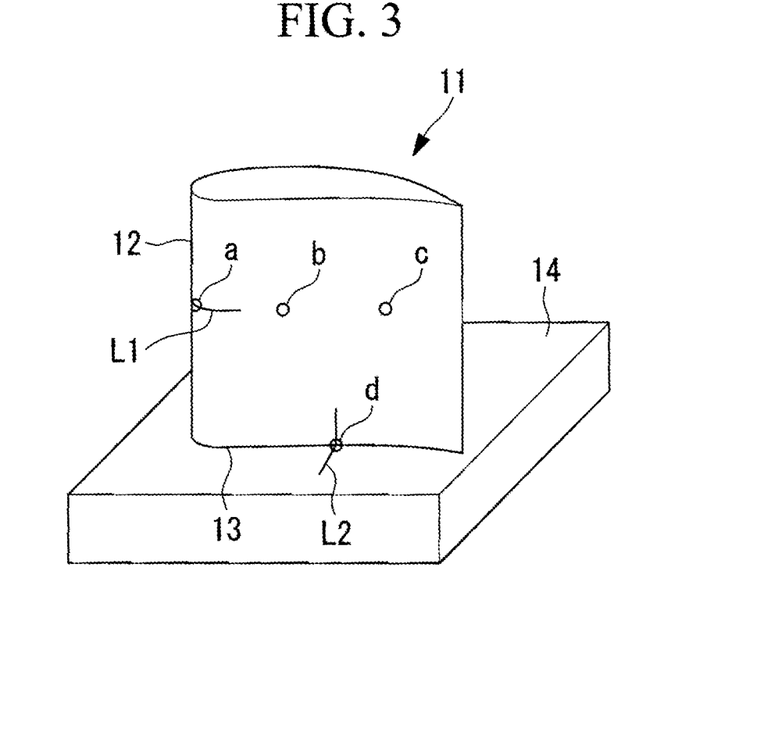
FIG. 3 is a perspective view showing a gas turbine blade and film thickness measurement points on the gas turbine blade.

The film thickness of the TBC of the turbine blade 11 is measured at about 32 portions including four portions a to d in FIG. 3 on one blade. As described above, the measurement using the ECT sensor 4 is performed in such a manner that the ECT sensor 4 is brought into contact with the surface of the TBC, a distance between the ECT sensor 4 and the metal member as the substrate of the TBC is measured, and a measurement result is obtained as a film thickness. Thus, if the measurement is performed with the ECT sensor 4 being tilted with respect to the surface of the TBC, an accurate film thickness cannot be obtained. In particular, an error tends to occur at the measurement point a on a leading edge 12 of the turbine blade 11 and the measurement point d on a fillet portion 13 provided on a rise from a platform 14 to a blade portion.

Figure 4:
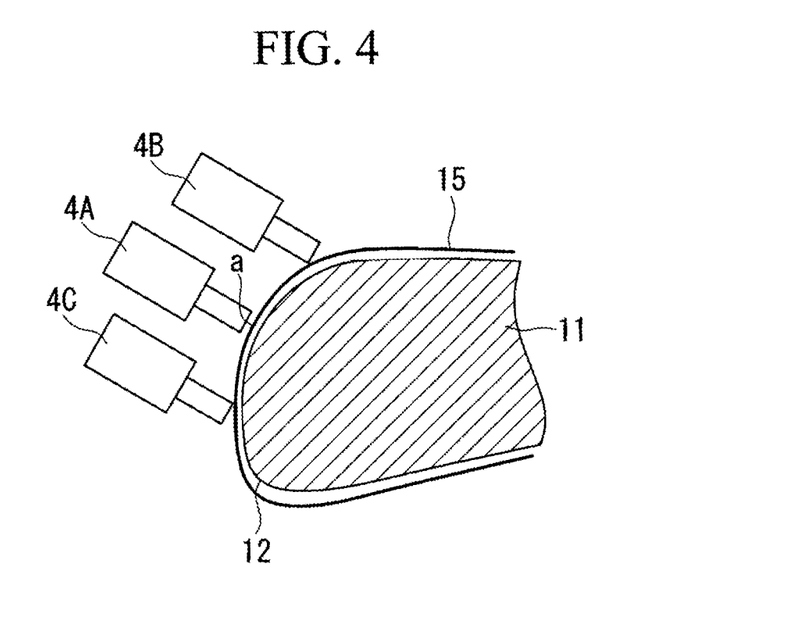
FIG. 4 is a sectional view showing the gas turbine blade and positions of the film thickness measurement apparatus.

With reference to FIG. 4, error occurrence will be described in a section cut along a line L1 including the measurement point a on the leading edge 12 in FIG. 3. In FIG. 4, three points 4A, 4B, and 4C are exemplified as measurement positions of the ECT sensor 4. At the measurement point 4A, the front end portion of the ECT sensor 4 is in proper contact with a surface of a TBC 15, and an accurate film thickness is measured. However, at the measurement points 4B, 4C, the front end portion of the ECT sensor 4 is in only partial contact with the surface of the TBC, the distance between the ECT sensor 4 and the metal member is longer than the film thickness of the TBC, and a measurement result does not represent a film thickness of the TBC.

Figure 5:
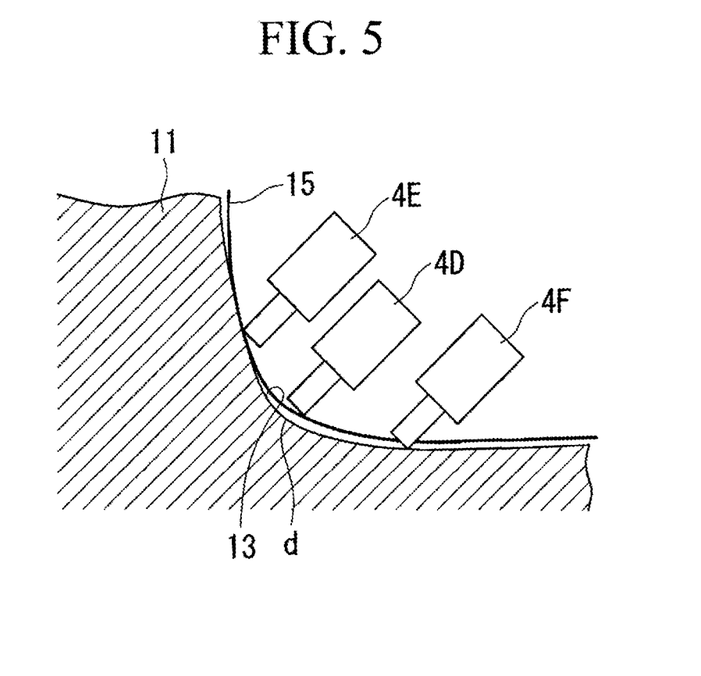
FIG. 5 is a sectional view showing the gas turbine blade and positions of the film thickness measurement apparatus.

Similarly, with reference to FIG. 5, error occurrence will be described in a section cut along a line L2 including the measurement point d on the fillet portion 13 in FIG. 3. In FIG. 5, three points 4D, 4E, and 4F are exemplified as measurement positions of the ECT sensor 4. At the measurement point 4D, the front end portion of the ECT sensor 4 is in proper contact with the surface of the TBC 15, and an accurate film thickness is measured. However, at the measurement points 4E, 4F, the front end portion of the ECT sensor 4 is in only partial contact with the surface of the TBC 15, the distance between the ECT sensor 4 and the metal member is longer than the film thickness of the TBC 15, and a measurement result still does not represent a film thickness of the TBC 15.

Figure 6:
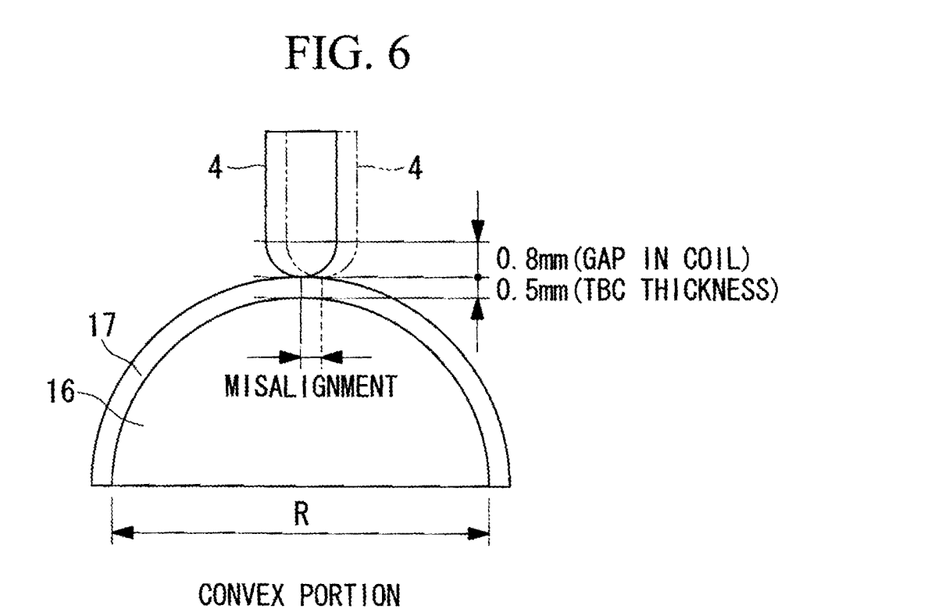
FIG. 6 is a schematic view showing a relationship between an ECT sensor and a convex portion of an object to be measured.
Figure 7:
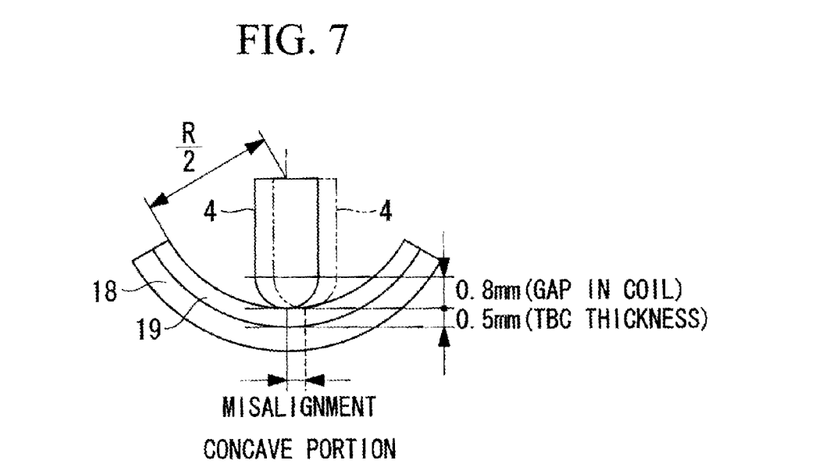
FIG. 7 is a schematic view showing a relationship between the ECT sensor and a concave portion of the object to be measured.
Figure 8:
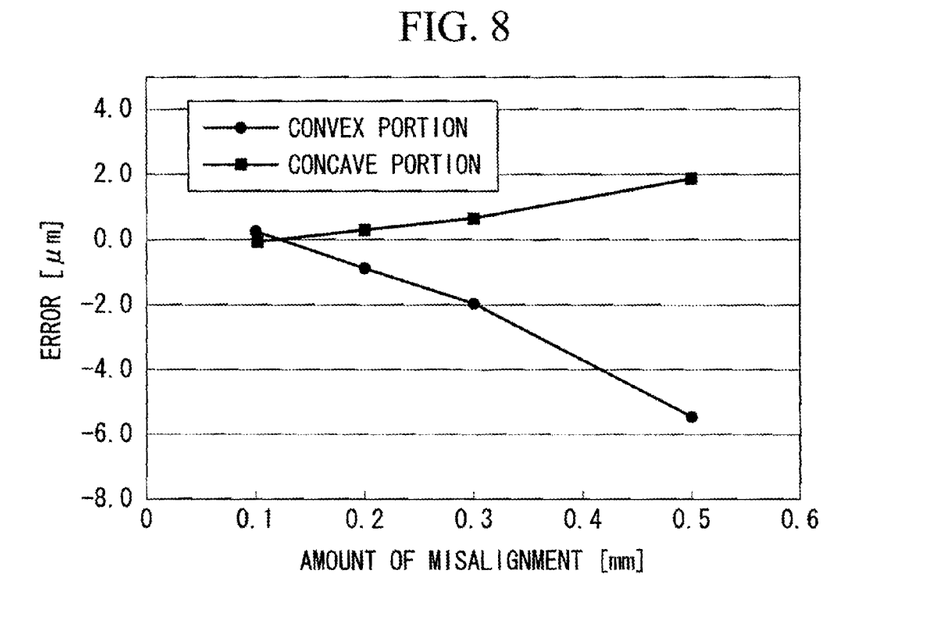
FIG. 8 is a graph showing a relationship between a measurement error of the ECT sensor and misalignment of the ECT sensor.

FIGS. 6 and 7 schematically show a convex portion of the leading edge 12 and a concave portion of the fillet portion 13. In FIGS. 6 and 7, TBCs 17, 19 are applied to substrates 16, 18, respectively. FIG. 8 shows a relationship between lateral misalignment of the ECT sensor 4, and a difference (error) between a measurement value and an actual value in film thickness measurement in this case. FIG. 8 shows an error that occurs when a film thickness of the TBCs 17, 19 is 0.5 mm, and a distance between the front end of the ECT sensor 4 and a coil portion in the ECT sensor 4 is 0.8 mm. Since the error tends to increase with increasing misalignment of the ECT sensor 4, the misalignment of the ECT sensor 4 is desirably minimized.

Then, the laser displacement meter 5 performs scanning with laser light in a linear direction, and obtains a sectional shape of the object to be measured in the two-dimensional plane from the scanning result. Then, an optimum measurement point suitable for actual measurement is calculated based on the obtained two-dimensional sectional shape, a sectional shape of the object to be measured derived from the CAD data stored in the storage unit 9, and a predetermined measurement point stored in the storage unit 9.

The metal member as the substrate of the turbine blade 11 is a cast, and thus a shape error occurs for each product. Thus, the measurement position calculation unit 8 superimposes and fits the sectional shape of the object to be measured in the two-dimensional plane obtained by scanning on the CAD data. Then, the optimum measurement point suitable for actual measurement is calculated based on a predetermined measurement point associated with the CAD data.

The arm drive unit 6 drives the front end portion of the robot arm 3 based on the calculated optimum measurement point to move the ECT sensor 4 and the laser displacement meter 5. At this time, the laser displacement meter 5 continuously obtains position information to obtain a current position of a destination. As a result, the ECT sensor 4 is guided to a measurement position suitable for measurement, and a more accurate film thickness of the TBC can be obtained at the optimum measurement point.

According to the first embodiment, even if the surface of the turbine blade 11 has a complex curved shape, and design data such as CAD data is different from a shape of an actual product, an optimum measurement point suitable for film thickness measurement of the TBC can be calculated. Also, the position and the direction of the robot arm 3 are adjusted to allow the ECT sensor 4 to be brought into proper contact with the TBC surface, thereby obtaining an accurate film thickness of the TBC.

Second Embodiment

Next, a film thickness measurement apparatus 2 according to a second embodiment of the present invention will be described.

In this embodiment, a film thickness of a TBC is measured with consideration of a temperature of a turbine blade 11 in measurement.

Figure 9:
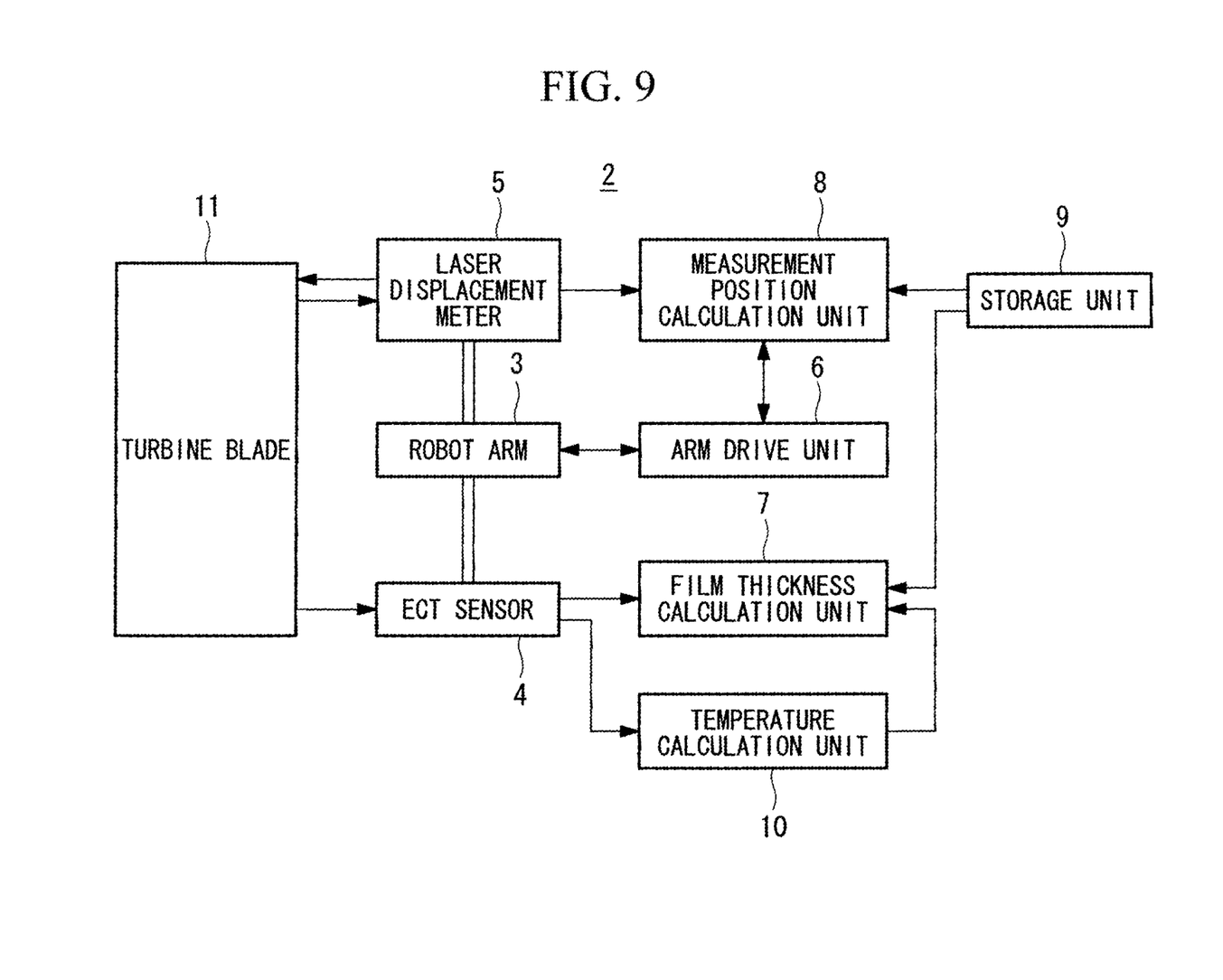
FIG. 9 is a block diagram showing a film thickness measurement apparatus according to a second embodiment of the present invention.

As shown in FIG. 9, the film thickness measurement apparatus 2 further includes temperature calculation unit 10 as compared to the film thickness measurement apparatus 1 according to the first embodiment. The temperature calculation unit 10 calculates a temperature based on a coil resistance value obtained by an ECT sensor 4. A coil of a copper wire or the like is used in the ECT sensor 4, and a measurement signal indicating a distance between a TBC surface and a metal member (film thickness) depends on the temperature. Thus, a constant temperature bath or the like is used to previously obtain a calibration curve of the ECT sensor 4, so that a film thickness can be calculated from the temperature and the measurement signal.

Figure 10:
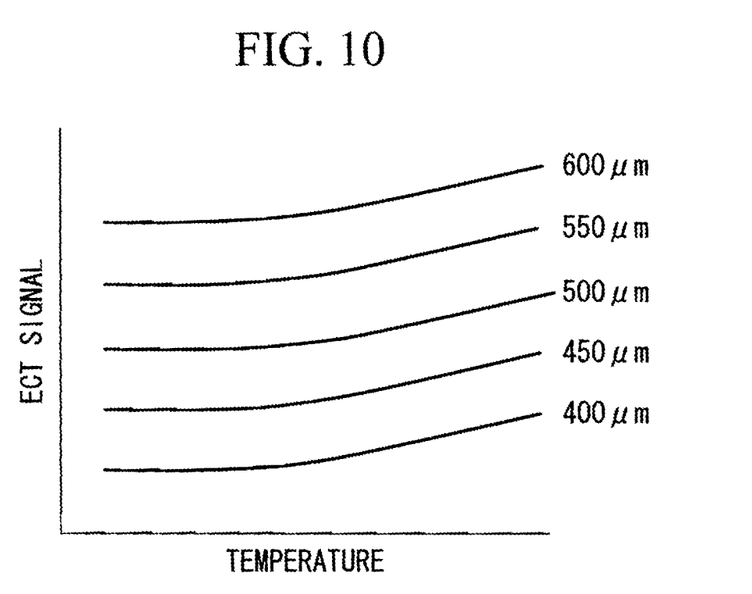
FIG. 10 is a graph showing a relationship between a signal measured by the ECT sensor and a measured temperature.

FIG. 10 shows an example of the calibration curve. The signal measured by the ECT sensor 4 and the temperature derived from the coil resistance value are obtained, and thus the film thickness of the TBC can be calculated using the calibration curve in FIG. 10.

A storage unit 9 stores the calibration curve. A film thickness measurement unit 7 uses the temperature calculated by the temperature calculation unit 10 and the calibration curve stored in the storage unit 9 to correct the film thickness based on the measurement signal of the ECT sensor 4. Thus, a more accurate film thickness of the TBC considering the temperature can be calculated.

As described above, according to this embodiment, the measurement using the robot arm 3 and also considering the temperature characteristics is performed. This allows accurate film thickness measurement of the TBC even in a state where the turbine blade 11 is too hot to be touched by a human. Also, a test result can be obtained even in a high temperature state (about 300° C.) immediately after application of the TBC, and thus the film thickness measurement can be performed without waiting for the TBC being cooled. This can reduce a time taken before determination whether reapplication such as removal or thermal respray of the TBC is required or not.

REFERENCE SIGNS LIST 1, 2 Film thickness measurement apparatus
3 Robot arm
4 ECT sensor (film thickness measurement unit)
5 Laser displacement meter (shape measurement unit)

6 Arm drive unit (drive unit)
7 Film thickness calculation unit
8 Measurement position calculation unit
9 Storage unit
10 Temperature calculation unit
11 Turbine blade

The invention claimed is:

1. A film thickness measurement apparatus comprising:
   a film thickness measurement unit that measures a film thickness of a thermal barrier coating formed on an object to be measured;
   a storage unit that stores a measurement point on the object to be measured which is a point where the film thickness of the thermal barrier coating is measured;
   a shape measurement unit that measures a shape of the object to be measured;
   a measurement position calculation unit that calculates an actual measurement point suitable for actual film thickness measurement using the film thickness measurement unit, based on the shape of the object to be measured which is measured by the shape measurement unit and the measurement point on the object to be measured which is stored in the storage unit; and
   a drive unit that drives the film thickness measurement unit to adjust a measurement position of the film thickness measurement unit based on the actual measurement point calculated by the measurement position calculation unit.

2. The film thickness measurement apparatus according to claim 1, wherein the shape measurement unit performs scanning with laser light in a linear direction to calculate the shape of the object to be measured in a two-dimensional plane.

3. The film thickness measurement apparatus according to claim 1, further comprising a temperature measurement unit that measures a surface temperature of the thermal barrier coating,
   wherein the film thickness measurement unit corrects the measured film thickness based on the surface temperature measured by the temperature measurement unit.

4. A film thickness measurement method comprising the steps of:
   a film thickness measurement unit measuring a film thickness of a thermal barrier coating formed on an object to be measured;
   a shape measurement unit measuring a shape of the object to be measured;
   a measurement position calculation unit calculating an actual measurement point suitable for actual film thickness measurement using the film thickness measurement unit, based on the shape of the object to be measured which is measured by the shape measurement unit and a measurement point on the object to be measured which is stored in a storage unit and is a point where the film thickness of the thermal barrier coating is measured; and
   a drive unit driving the film thickness measurement unit to adjust a measurement position of the film thickness measurement unit based on the actual measurement point calculated by the measurement position calculation unit.

* * * * *